Dec. 22, 1970 R. W. AHRONS 3,550,089

COMPLEMENTARY SEMICONDUCTOR MATRIX ARRAYS FOR LOW POWER DISSIPATION LOGIC APPLICATION

Filed Oct. 17, 1968 2 Sheets-Sheet 1

INVENTOR
Richard W. Ahrons

BY H. Christoffersen

ATTORNEY

Dec. 22, 1970 R. W. AHRONS 3,550,089

COMPLEMENTARY SEMICONDUCTOR MATRIX ARRAYS FOR LOW POWER DISSIPATION LOGIC APPLICATION

Filed Oct. 17, 1968 2 Sheets-Sheet 2

INVENTOR

Richard W. Ahrons

BY H. Christoffersen

ATTORNEY 3,550,089

COMPLEMENTARY SEMICONDUCTOR MATRIX ARRAYS FOR LOW POWER DISSIPATION LOGIC APPLICATION

Richard W. Ahrons, Somerville, N.J., assignor to RCA Corporation, a corporation of Delaware Filed Oct. 17, 1968, Ser. No. 768,557
Int. Cl. H04q 3/00
U.S. Cl. 340—166 10 Claims

ABSTRACT OF THE DISCLOSURE

Two matrix arrays of semiconductor devices such as diodes. Both have equal numbers of column and row conductors and the column conductors of the two arrays are connected. Some column-row crossings in one array are connected by devices poled to conduct in one direction; the remaining column-row crossings in the other array are connected by devices poled to conduct in the opposite direction. A sensor is connected to each column conductor. Two rows, one in each array, are energized at a time causing some sensors to be energized through diodes in one array and other sensors to be clamped to ground through diodes in the other array.

BACKGROUND OF THE INVENTION

The use of matrix arrays as memories and to perform logic functions is well-known in the art. Such arrays, when energized, provide binary signals to a plurality of sensors. The arrays comprise nonlinear or asymmetrically current conducting elements which provide output signals which generally are unidirectional nature. That is, in the ON condition, the array is clamped by a low impedance path (saturation resistance or forward voltage drop) to a signal source, whereas in the OFF con dition, the output is either disconnected from or coupled by a very high impedance to a signal source.

The input terminals of the signal sensors are connected to the output terminals of the array. Because of the type of operation described above, these input terminals tend to float in the OFF condition of the array. This is undesirable because the sensors are high impedance, high gain devices and a floating input terminal of a device of this type may, in some cases, be sensed as the presence rather than the absence of a signal.

This condition may be corrected by connecting the input terminals of the sensors to a point of reference potential through an impedance. However, this creates another problem. In the ON condition there then results undue power dissipation in the impedance. Making this impedance high, to reduce the power dissipation, decreases the speed of operation of the sensors because it increases the time required to charge or discharge the capacitance present at the input terminals of the sensors through this high impedance.

It is an object of this invention to provide a circuit for performing the same function as the one discussed above, but which has little or no quiescent power dissipation and yet is capable of operating at high speeds.

BRIEF SUMMARY OF THE INVENTION

Circuits embodying the invention include two matrix arrays of nonlinear current conducting elements having the same number of row and column conductors. The column conductors of one matrix are connected to the corresponding column conductors of the other matrix and to the input nodes of respective signal sensors. Each row conductor of one matrix is paired with a corresponding row conductor of the other matrix. The information stored at the bit locations of the one matrix is complementary to that stored in the corresponding bit locations of the other matrix. A bit location is defined as the intersection of a row and column and each bit location stores either a logic 1 or a logic 0.

BRIEF DESCRIPTION OF THE DRAWING

In the accompanying drawings, like reference characters denote like components.

DETAILED DESCRIPTION

Figure 1:
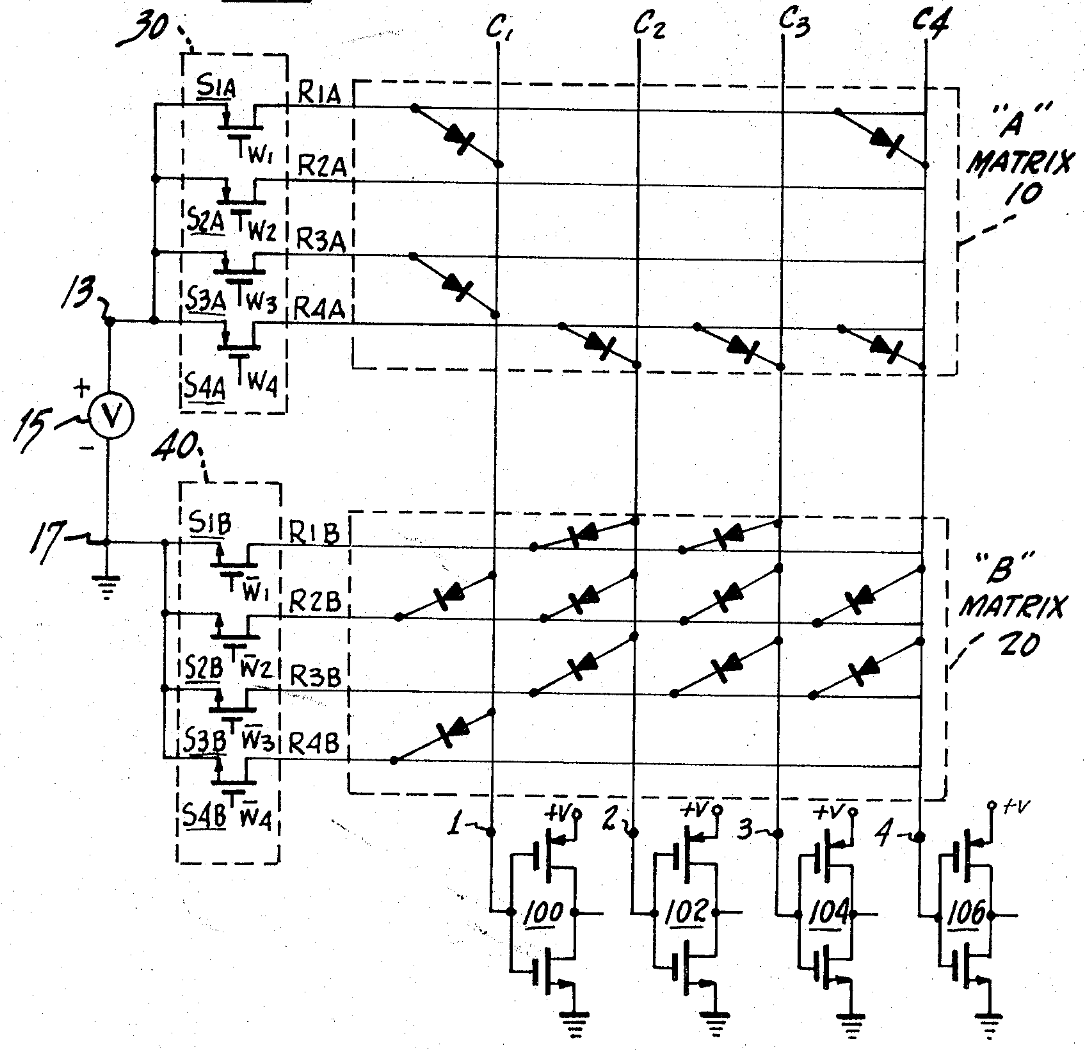
FIG. 1 is a schematic drawing of two diode arrays connected in a circuit arrangement embodying the present invention.

The matrix arrays used to practice the invention each comprise $m$ rows and $n$ columns, where $m$ and $n$ are integers greater than one and can be equal or not. For ease of illustration, in the circuit shown in FIG. 1 $m=n=4$. This circuit includes two diode matrices—"A" matrix 10 and "B" matrix 20. The column conductors C1, C2, C3, C4 are common to both matrices and are connected to the respective input nodes 1, 2, 3, 4 of the respective output sense means 100, 102, 104, 106. Each row conductor R1A, R2A, R3A, R4A of the A matrix is paired with a corresponding row conductor R1B, R2B, R3B, R4B of the B matrix.

Each row conductor is connected to the drain electrode of a different insulated-gate field-effect transistor (IGFET). (P-type IGFET's are indicated in this application by an arrow on the source lead pointing towards the body of the device and N-type IGFET's are indicated by an arrow on the source lead pointing away from the body of the device.) The transistors (S1A, S2A, S3A, S4A) connected to the row conductors of the A matrix are P-type IGFET's having their source electrodes connected to the positive terminal 13 of power supply 15 of potential +V volts. The transistors (S1B, S2B, S3B, S4B) connected to the row conductors of the B matrix are N-type devices having their source electrodes connected to the negative terminal 17 of power supply 15 shown in FIG. 1 as ground or reference potential.

A switch from set 30 (e.g., S1A) and a corresponding witch from set 40 (e.g., S1B) constitute a pair and in the operation of the circuit, one pair of switches is simultaneously energized by the application of W and $\overline{W}$ pulses ($\overline{W}$ being the complement of W) to the respective gate-electrodes of such a pair of transistors. Thus, at any one instant, only one row of the A matrix is connected to +V volts and only one row of the B matrix is connected to ground.

The intersection of a row conductor and a column conductor is defined as a bit location and each bit location is designated by a two-digit number and a letter.

The first digit refers to the order of the row, the second digit refers to the order of the column, and the letter denotes either the A or the B matrix. Thus, for example, 11A refers to the first row, first column of the A matrix and 12B refers to the first row, second column of the B matrix.

Certain bit locations of each matrix contain nonlinear or asymmetrically conducting elements coupling the rows and columns. In the circuit of FIG. 1 diodes are used as the coupling elements. In the A matrix the diodes have their anodes connected to the row conductors and their cathodes connected to the column conductors. The bit locations of the A matrix containing diodes provide low impedance conduction paths for current flowing from the associated row conductors into the associated column conductors. In the B matrix, the diodes have their anodes connected to the column conductors and their cathodes connected to the row conductors. The bit locations of the B matrix containing diodes thus provide low impedance conduction paths for current flowing from the associated columns into the associated rows. The A matrix provides the conduction paths to clamp selected columns to +V volts when one of the row select switches shown in dashed box 30 is energized and the B matrix provides conduction paths to clamp selected columns to ground potential when one of the row select switches shown in dashed box 40 is energized.

In the A matrix, the bit locations containing diodes store a logic 1 and the bit locations containing no diodes store a logic 0. The B matrix is the complement of the A matrix—where there is a diode in a bit location of the A matrix, there is no diode in the corresponding bit location of the B matrix. The B matrix thus generates the complement of the function generated by the A matrix and, therefore, one matrix may be said to be the complement of the other.

In operation, the matrices shown in FIG. 1 are word organized. That is, each row represents a word of information with the number of bits per word equal to the number of columns, that is, four bits per word. Assume, for example, that the information or word contained in rows 1A and 1B has been selected to be read out. Switches S1A and S1B are simultaneously enabled by the application of a positive signal ($\overline{W}_1$) to the control electrode of transistor S1B and a negative signal ($W_1$) to the control electrode of transistor S1A. The other row select switches shown in the dashed boxes 30 and 40 are disabled.

The word 1001 is represented by having diodes in the 11A, 14A, 12B and 13B bit locations and having no elements in the 12A, 13A, 11B and 14B bit locations. The closure of switch S1A applies +V volts, which is arbitrarily selected as the logic 1 level, to row 1A and, the closure of switch S1B applies ground potential, which is arbitrarily selected as the logic 0 level, to row 1B. The diodes in bit locations 11A and 14A are forward biased by the positive potential applied to row 1A and +V volts is applied to columns C1 and C4. Since there is no element coupling columns 1 and 4 and row 1B, and since the other word select switches are open, the potential at terminals 1 and 4 is substantially equal to +V volts. There is practically no steady state power dissipation, since there exists only extremely high impedance paths between columns C1 and C4 and ground and, due to the high reverse impedance of the diodes, there are no sneak paths in the circuit.

Columns C2 and C3 are not connected to row R1A, since there are no diodes in bit locations 12A and 13A. They are, however, coupled to row R1B by means of the diodes in bit locations 12B and 13B. The impedance of the diodes in the forward direction being very low, any charge on columns C2 and C3 is quickly discharged to ground potential through switch S1B. Since no positive source of potential is connected to columns C2 and C3, there is again no steady state power dissipation.

The process just described is repeated when, for example, the word contained in rows R2A and R2B is selected to be read out. Switches S2A and S2B are enabled while the other row select switches are disabled.

The word 0000 is stored in row 2 of the memory. This is manifested by no diode coupling row R2A to any of the column conductors and four diodes coupling row R2B to the respective columns. It is also clear that rows 3 and 4 store the words 1000 and 0111, respectively.

The column conductors are connected to the input nodes 1, 2, 3, 4 of the respective output sensors 100, 102, 104, 106. The input impedance of these sensors, which are shown as complementary MOS inverters, is extremely high and may be characterized by a resistance of the order of $10^{12}$ ohms shunted by a capacitance of a few picofarads. The input impedance of the output sensor may, therefore, be characterized as a capacitance which will be charged to either +V volts by way of the A matrix, or discharged to ground by way of the B matrix. The only power dissipation of the system occurs in the charging and discharging of the input node capacitance and, in view of its high impedance, this dissipation is extremely small.

The impedance of the charging and discharging paths being the series combination of the forward voltage drop of a diode and the saturation resistance of a transistor operated as a switch is extremely low (i.e., less than 1 KΩ). Since the input node capacitance is a few picofarads, the time constant is in the order of nanoseconds and the capacitance will therefore be charged and discharged very quickly.

Complementary arrays thus provide high operating speeds and minimal power dissipation.

The circuit of FIG. 1 may be constructed by integrated circuit methods or may consist of discrete components. The invention is extremely useful in embodiments using integrated circuits because of the extremely low power dissipation. A particular embodiment of the invention uses fusible diode matrices to produce a fixed memory in a computer application. In a fusible diode array, there is a fusible link in series with each diode. The fusible link may be blown by passing a high current therein allowing any desired pattern to be programmed into the memory.

Figure 2:
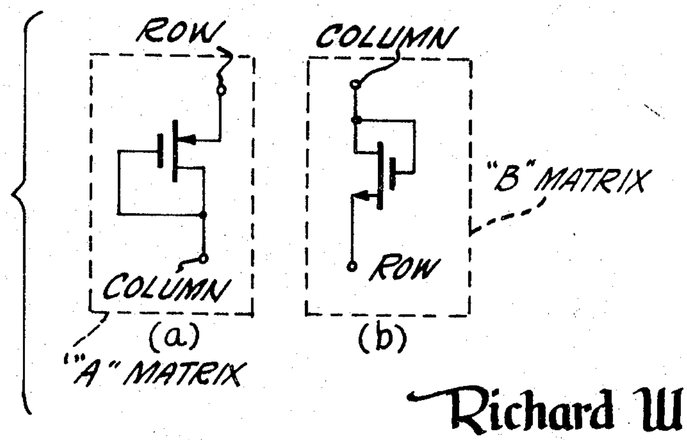
FIGS. 2(*a*) and 2(*b*) are drawings of transistors connected as diodes, which may be incorporated in matrix arrays to practice the invention.

FIGS. 2(*a*) and 2(*b*) show respectively, a P-type IGFET and an N-type IGFET, each having its gate (control electrode) connected to its drain electrode. Thus connected, the transistors are equivalent to diodes and behave as such.

The P-type IGFET shown in FIG. 2(*a*) may be used instead of the diodes shown in the A matrix with the drain electrodes of the IGFET's being connected to the column conductors and the source electrodes being connected to the row conductors. The N-type IGFET's shown in FIG. 2(*b*) may be used instead of the diodes employed in the B matrix, with the drain electrodes connected to the column conductors and the source electrodes connected to the row conductors. As in the case of the diodes, the P-type elements in the A matrix are connected in a direction to conduct current from the associated row into the associated column and the N-type elements in the B matrix are connected in a direction to conduct current from the associated column into the associated row. It should be obvious to one skilled in the art that bipolar devices may be used instead of IGFET's.

Figure 3:
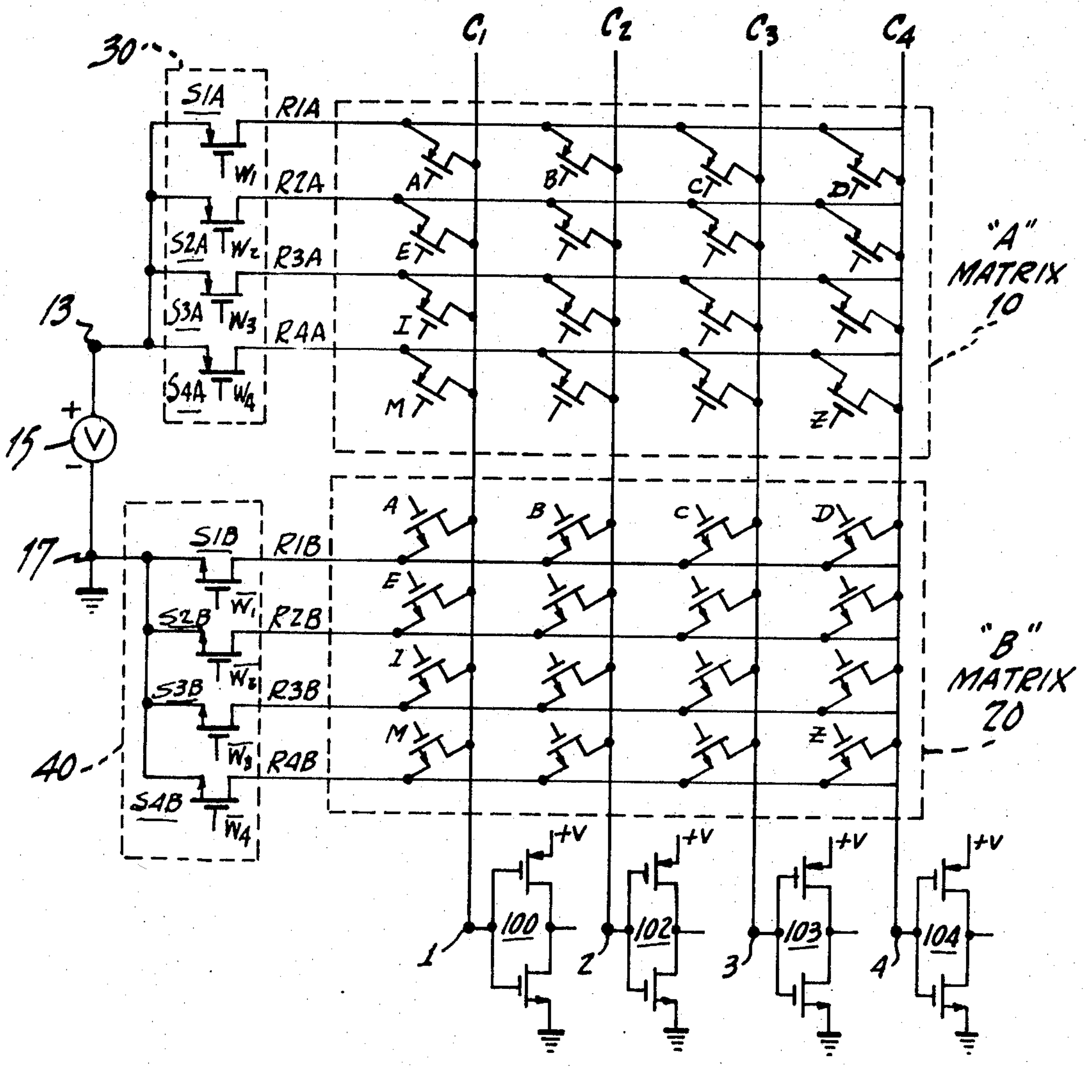
FIG. 3 is a schematic drawing of two complementary transistor arrays connected in a circuit arrangement embodying the invention.

The circuit of FIG. 3 shows two matrices wherein the coupling elements are IGFET's, the A matrix consisting of P-type devices and the B matrix consisting of N-type devices. As in the configuration of FIG. 1, each column conductor is common to both matrices and serves as the output point of the matrix and each row conductor of one matrix is paired with a corresponding row conductor of the other matrix. In contrast to the circuit of FIG. 1, however, each bit location contains a connecting element, namely a transistor, having its drain electrode connected to a column conductor and its source electrode connected to a row conductor. The elements of the A matrix being P-type devices are connected in a direction to conduct current from an associated row into an associated column and thereby when selected, will clamp selected columns to +V volts or logic 1. The elements of the B matrix are connected in a direction to conduct current from the associated column into the associated row and thereby when selected, will clamp selected columns to ground or logic 0.

Since transistors have an independent electrode, namely the gate or control electrode, the conductivity or nonconductivity of certain elements may be controlled by the potential applied thereto. For this reason, the circuit of FIG. 3 may be used to provide a multiplicity of functions including, by way of example, a variable memory, a variable programmer, or the performance of complementary logic operations. In addition to the use of opposite conductivity type devices in one and the other matrix, the generation of complementary functions by the A and B matrices is achieved by applying the same polarity signals to the gate electrodes of an element in the A matrix and its corresponding element in the B matrix. Thus, a negative signal (logic 0) applied to the control electrodes of a P-type device and an N-type device will cause the P-type device to turn on, generating a low impedance, high conduction path, while the N-type device is turned off, presenting an extremely high impedance path through which only a small leakage current can flow. A positive signal (logic 1) applied to the combination causes the P-type device to turn off and the N-type device to turn on. Thus, though an element is connected in each bit location, only selected rows and columns are coupled by means of a low impedance current conduction path.

The function 1001, for example, is generated with the transistorized matrices by applying a logic 0 signal to the gates of the transistors in bit locations 11A, 14A, 11B and 14B and by applying a logic 1 signal to the gate of the transistors in bit locations 12A, 13A, 12B and 13B.

The matrix is energized by enabling switches S1A and S1B and disabling the remaining row selector switches and the unused transistors. Terminals 1 and 4 fed by C1 and C4 will be clamped to the +V volts level, while terminals 2 and 3 connected to columns C2 and C3 will be clamped to ground.

Note that a corresponding pair of transistor elements behave as a complementary inverter pair clamping the output point (the associated column) to either +V or ground without providing a direct current conduction path between the two voltage levels.

Note also that a unidirectional element, such as a diode, connected in series with the drain-source path of each transistor prevents any sneak paths in the variable logic matrix.

In addition, the field-effect transistors shown could be of the metal-nitride semiconductor type having storage in the gate circuit.

It should be obvious to one skilled in the art that bipolar transistors could be substituted for the IGFET's shown in FIG. 3.

While in the present application the row select switches are shown as IGFET's, they are used as simple ON-OFF switches and could be replaced by bipolar devices, relays or ordinary switches.

It should also be obvious that what has been referred to as a column could have been referred to as a row and what has been referred to as a row could have been referred to as a column.

What is claimed is:

1. The combination comprising:

two matrix arrays, one having the same number of row and column conductors as the other, the column conductors of one array being connected to the respective column conductors of the other array, and each row conductor of one matrix being paired with a corresponding row conductor of the other matrix; and a plurality of nonlinear current conducting elements, some in one array and some in the other, coupling certain of the row conductors to certain of the column conductors, the elements associated with a row of one matrix being connected to conduct current from that row into certain columns and the elements associated with its paired row of the other matrix being connected to conduct current from the remaining columns into said paired row.

2. The combination as claimed in claim 1, wherein the nonlinear current conducting elements are rectifying devices having a low impedance in the forward direction permitting current conduction and a high impedance in the reverse direction inhibiting current conduction.

3. The combination as claimed in claim 2, wherein each intersection of a row and column conductor is defined as a bit location, each bit location of one matrix having a corresponding bit location in the other matrix; and wherein the bit locations of one matrix, corresponding to the bit locations of the other matrix containing rectifying devices, contain no rectifying devices.

4. The combination as claimed in claim 3, wherein the rectifying devices are transistors having an input electrode, an output electrode and a control electrode;

wherein the input electrodes are connected to the row conductors, the control electrodes are connected to the output electrodes, said output electrodes being connected to the column conductors; and wherein the transistors connected in one matrix are of one conductivity type and the transistors connected in the other matrix are of the opposite conductivity type.

5. The combination as claimed in claim 4, further providing means for selectively connecting the row conductor of one matrix to a first source of potential and the row conductors of the other matrix to a second source of potential, said second source being negative with respect to said first source of potential; and further providing a plurality of sensing means, each respectively connected to a different one of the column conductors.

6. The combination as claimed in claim 5, wherein said means for selectively connecting the row conductors comprise a plurality of switch means, each switch means being connected at one end to a different row conductor; the other end of the switches connected to the rows of one matrix being connected to said first source of potential, and the other end of the switches connected to the rows of the second matrix being connected to said second source of potential; and means for simultaneously energizing two switch means, each switch means being connected to one row of a pair of row conductors.

7. The combination as claimed in claim 6, wherein the switches are transistors and wherein the transistors coupling the rows of one matrix are of one conductivity type, and the transistors coupling the rows of the second matrix are of opposite conductivity type.

8. The combination as claimed in claim 1, wherein the nonlinear conducting elements are transistors each having a first electrode and a second electrode defining the ends of a conduction path and a control electrode whose applied potential controls the conductivity of said conduction path;

wherein the transistors of one matrix are of one conductivity type and the transistors of the other matrix are of the opposite conductivity type; and wherein each bit location contains a transistor having the first and second electrode connected between a row and a column.

9. The combination as claimed in claim 8, further providing a source of digital control signals having either a first value representative of the logic 1 level or a second value representative of the logic 0 level; and wherein the same digital control signal is applied to the control element of a transistor in a certain bit location of one matrix and to the control element of the transistor in the corresponding bit location of the other matrix.

10. In combination:

two matrix arrays, each with equal numbers of column and row conductors, the column conductors of one array connected to the column conductors of the other array, and each row of one array paired with a corresponding row of the other array;

a plurality of asymmetrically conducting elements connected to conduct in one sense between certain column and row conductors of one array; and a plurality of asymmetrically conducting elements connected to conduct in the opposite sense between the remaining column and row conductors of the second array.

References Cited

UNITED STATES PATENTS 3,047,840 7/1962 Harms et al. ---------- 340—166

HAROLD I. PITTS, Primary Examiner

U.S. Cl. X.R.

340—147, 176